Sept. 8, 1953     F. D. JOESTING     2,651,468
SELF-CYCLING PNEUMATIC CONTROL APPARATUS
Filed Nov. 3, 1949     3 Sheets-Sheet 1

Inventor
FREDERICK D. JOESTING
By George H Fisher
Attorney

Fig. 4

Sept. 8, 1953  F. D. JOESTING  2,651,468
SELF-CYCLING PNEUMATIC CONTROL APPARATUS
Filed Nov. 3, 1949  3 Sheets-Sheet 3

FIG. 5

Inventor
FREDERICK D. JOESTING
By
George H Fisher
Attorney

Patented Sept. 8, 1953

2,651,468

UNITED STATES PATENT OFFICE 2,651,468

SELF-CYCLING PNEUMATIC CONTROL APPARATUS

Frederick D. Joesting, Oak Park, Ill., assignor to Minneapolis-Honeywell Regulator Company, Minneapolis, Minn., a corporation of Delaware Application November 3, 1949, Serial No. 125,261

16 Claims. (Cl. 236—44)

This invention relates to self-cycling pneumatic condition control apparatus.

Some types of conditioning apparatus, especially those normally controlled in an on-off manner such as steam heating systems and spray humidifiers, are difficult to control satisfactorily under variable loads because of a tendency to overshoot the desired control points. Modulating control is generally satisfactory for heavier loads in two pipe steam heating systems but distribution problems become acute under light load conditions hence this solution is only partially satisfactory and it, of course, cannot be used at all in one pipe systems. Likewise, varying the pressure on the atomizer heads of a humidifier is satisfactory so long as the pressure remains high enough to give good atomizing action; but when the pressure is reduced for lower humidifying loads, the larger drops of water formed are not readily absorbed by the surrounding air, with a consequent wetting of nearby surfaces. The present invention solves these difficulties by causing cyclic operation of the control apparatus, thereby obtaining the benefits of full pressure for the systems involved, and, by varying the relative lengths of the "on" and "off" periods, the capacity of the conditioning system is accurately matched with the load. It is therefore an object of this invention to provide an improved time-modulated pneumatic control system.

It is a further object to provide a pneumatic control system capable of cycling action without a separate timer mechanism.

It is another object to provide an improved pneumatic control system capable of maintaining a condition within closer limits than apparatus previously used.

It is an additional object to provide a pneumatic control system for cycling operation wherein the relative length of the "on" and "off" periods depends upon whether the condition of the medium being treated is nearer the upper or the lower limits of the operating differential of the system and wherein the system is continuously "on" or "off" when said condition is outside the operating differential.

It is a further object to provide a snap acting pneumatic control device having pressure actuated means arranged to relatively slowly adjust the device by an amount exceeding its normal operating differential.

It is a more limited object to provide a bleed type positive acting pneumatic control device including a pneumatic motor means connected through a restriction to a branch line passage of the device, said motor means being constructed and arranged to adjust said device and being capable of an adjustment exceeding the normal operating differential of the device.

Even more limited objects provide for positive action pneumatic thermostats, pressure controls, humidistats and the like having pressure actuated means connected through a time delay device to a branch line passage of the apparatus and arranged to adjust the control apparatus sufficiently to cause forced cycling when the condition of the medium being treated is within the normal control range of the apparatus.

While the present invention is best used with pneumatic control apparatus, it is broader than this and may be used with other types of apparatus, hence it is a further object to provide a two-position controller having a normal operating differential and a force exerting adjusting device operable in response to the position of the controller and effective to adjust the controller by an amount exceeding its normal operating differential.

These and other objects will become apparent upon a study of the following specification and drawings wherein:

Figure 1:
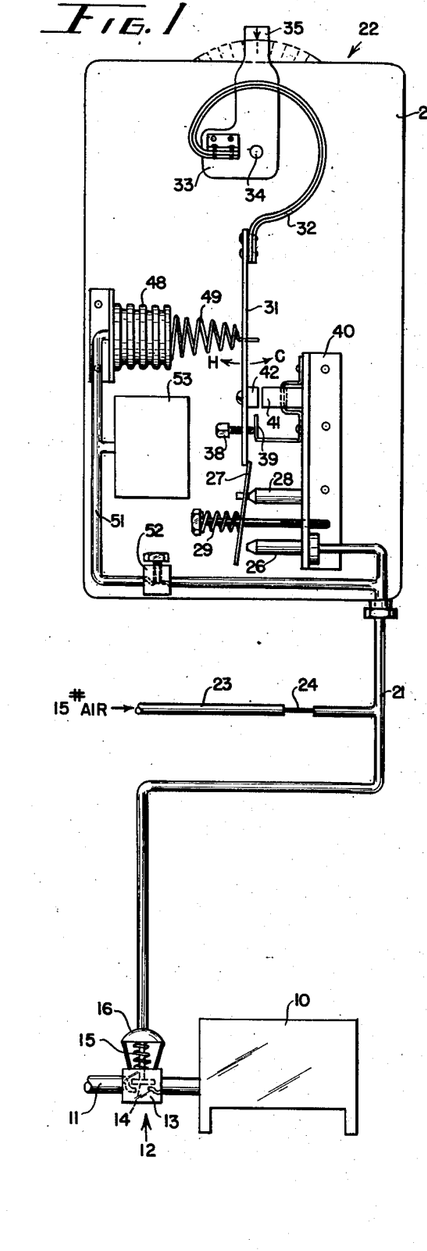
Figure 1 is a schematic view of a pneumatic temperature control system incorporating the present invention.

In Figure 1, radiator 10 of a conventional one-pipe steam heating system is supplied with steam, from a source not shown, through pipe 11 under the control of valve 12, it being obvious that each radiator of the system may be controlled by an individual valve such as 12, or the several radiators of the system, or of a zone thereof, may be connected in parallel with radiator 10 and under the control of a single valve such as 12. Valve 12 is a conventional one for this service and comprises a valve body 13, a movable valve member 14, a spring 15 and a pneumatic motor 16, spring 15 being arranged to hold member 14 in an upper open position and motor 16 being arranged to oppose spring 15 and drive valve member 14 to a lower closed position when sufficient air pressure is applied to said motor.

Motor 16 is supplied with air through branch air line 21 connected to thermostat 22 and to an air main 23 which in turn is connected to a suitable source, not shown, of air at, for instance, 15 lbs. per square inch pressure, the quantity of air available for this apparatus being limited by a flow restricting orifice, 24.

Thermostat 22 is basically a conventional snap acting bleed type controller having a base 25, a nozzle valve member 26, a co-acting valve or nozzle plate 27 carried on pivots 28 (only one being shown) and urged to a nozzle closing position by spring 29. Plate 26 is moved away from its closing position by arm 31 attached to bimetal 32 which in turn is attached to a movable anchor plate 33, said arm 31 extending over the upper edge of plate 27. Anchor member 33, pivoted on pin 34, is adjustable by projecting handle 35 for adjusting the control point of the device, the adjustment being maintained by the friction of the pivotal connection. Bimetal 32 is arranged so that it moves arm 31 to the right on a temperature decrease and to the left on a temperature rise, movement to the right being limited by a stop screw 38 engaging stop flange 39, which is attached to a flanged support member 40, this latter member also serving as the mounting bracket for the elements of the aforementioned nozzle valve assembly.

To insure two-position control of valve plate 27, and thereby of steam valve 12, a snap acting mechanism is provided comprising a small permanent magnet 41 attached to member 40 and a coacting armature 42 attached to arm 31, the variations in magnetic attraction between these members varying considerably as armature 42 moves away or toward magnet 41 and thus, in a manner well known in this art, providing snap action of valve plate 27 and causing the controller 22 to have a definite operating differential, or change in condition values necessary to move the nozzle plate 27 from one controlling position to the other.

This magnet snap mechanism, as well as the other structural details, are only illustrative for any other snap action mechanism, and other controller details, will work equally well with the present apparatus.

The apparatus thus far described is conventional and works reasonably well excepting that the radiator or radiators tend to overheat before the bimetal 32 can sense an increase in room temperature. This tendency to overheat can be corrected by modulating or proportional control in some heating systems, but this solution is impractical in one-pipe steam systems because a partially closed valve tends to trap condensate in its radiator. Further, with any steam system, distribution difficulties are encountered when the steam supply is throttled to a low value.

The above described conventional apparatus is made to control much better by forcing it to cycle the valve 12 open and closed in a manner to give time modulation of the steam supplied to the radiators and, because the steam valve is either fully open or closed, good distribution and proper condensate return will result. To cause this action, bellows 48 is suitably mounted on base 25 and is arranged to variably compress spring 49 to thereby exert a variable bias on arm 31, the movement of bellows 48 being due to variations in the air pressure in said bellows, air being supplied to the bellows through a connection to nozzle 26 including a conduit 51 having a restriction 52 therein. To make the present apparatus cycle as intended, it is necessary that the change in bias effected by maximum expansion of bellows 48 exceeds the normal operating differential of the controller, hence the bellows and spring 49 are constructed and arranged to insure this result. Restrictor 52 tends to delay the pressure changes in bellows 48 and thereby tends to increase the length of the "on" and "off" periods of the cycle. To further increase the length of these periods, a capacity tank 53 may also be connected to conduit 51 to thereby increase the amount of air that must flow through the restrictor 52 to effect a predetermined pressure change in the bellows.

While the arrangement of Figure 1 shows bellows 48 operating through spring 49 to adjustably bias the device by exerting a variable force on arm 31, this bias may be imposed equally well by other mechanisms. For instance, in Figure 2, bimetal 32 is shown attached to a member 63 which is freely pivoted on pin 34 and is connected to anchor plate 33 by a centering spring 64 coacting with a projecting tongue 65 of member 63, this spring cooperating with projecting arm 66 of member 63 which engages one end of compression spring 67 to thus position member 63 relative to member 33. Spring 67 is adjusted by bellows 48 in the same manner as spring 49 in the above example. In this modification, expansion of bellows 48 results in compression of spring 67 and a biasing of arm 66 in a counterclockwise direction, thereby biasing bimetal 32 in the same direction as an increase in pressure in 48 in the apparatus of Figure 1.

Figure 3:
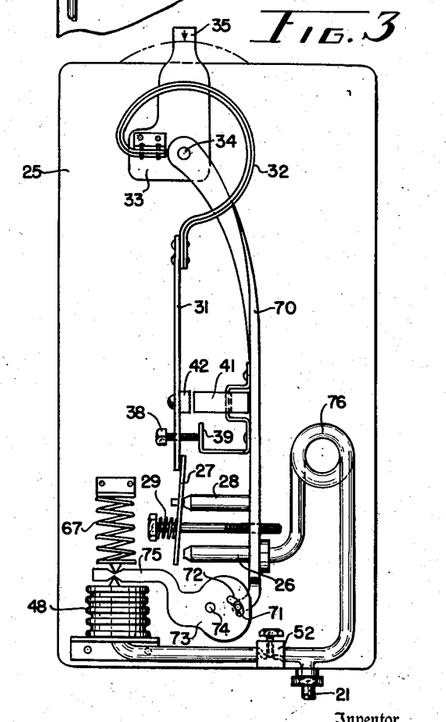
Figure 3 is a schematic view of another modification of the thermotsat of Figure 1.

Still another way of effecting a bias on the present controller is shown in Figure 3, wherein the like parts of this device are numbered the same as those in Figure 1. In this device, the nozzle assembly, the permanent magnet and the like are attached to a pivoted support member 70, this mounting member being freely pivoted on pin 34 and held in an adjusted position by pin 71 coacting with cam slot 72 in member 73 which is rotatable about pivot 74 by the resultant force of bellows 48 and spring 67 acting on arm 75 of said member 73. Expansion of bellows 48 rotates member 73 clockwise and causes movement of member 70 in a clockwise direction, while a contraction of said bellows permits spring 67 to cause motion of said members in an opposite direction. Thus, this apparatus changes the control point by shifting the position of the valve mechanism to thus change the working position of arm 31. Because movement of member 70 and the attached valve mechanism requires a reasonably flexible connection between branch air line 21 and member 70, loop 76 is provided, but any other suitable flexible connection means may be used. Neither of the latter two modifications show the capacity tank 53 used in Figure 1 but obviously such a tank may be used if desired.

*Operation*

By ignoring bellows 48 in Figure 1, it is apparent that the present apparatus will operate in a conventional manner, with bimetal 32 operating to move plate 27 away from nozzle 26 on a temperature drop, to thereby permit spring 15 to open valve 12, and the element 32 will cause closure of said nozzle with a consequent closing of valve 12 on a temperature rise, both the opening and closing movements of the nozzle being with a snap action because of magnet 41 and its coacting armature 42. Further, due to the use of this snap acting means, the apparatus will tend to operate with a definite differential which is, for the purpose of this illustration, one degree.

Now, assume that bellows 48 is operative to change the control point of device 22 by a maximum of 1½° as the pressure imposed on it varies from near zero to the maximum branch pressure, usually about 15 pounds per square inch. In the position shown, the pressure in bellows 48 is near zero due to the open nozzle 26 and the restricted air supply, spring 49 is exerting its minimum force and, assuming that device 22 would, without bellows 48, normally operate to open nozzle 26 at 70° and would operate to close said nozzle at 71°, let it now be assumed that said device is responding to a temperature of slightly under 70°.

With heat being supplied by radiator 10 due to open valve 12, the temperature rises and when the temperature reaches 71°, bimetal 32 operates to close nozzle 26. This causes pressure to build up in branch line 21 and motor 16 to close valve 12. Also pressure starts building up in bellows 48 which tends to expand and increase the force exerted by spring 49. When the additional force exerted by spring 49, due to the expansion of bellows 48, is sufficient to bias arm 31 of device 22 by an amount equivalent to about a one degree shift in control point, said arm is forced to the right just as though the device is responding to a 70° temperature. This opens nozzle 26 and permits valve 12 to open and supply more heat. Simultaneously, the pressure in bellows 48 starts bleeding down and the bias exerted by spring 49 is lessened. As the space temperature was 71° when this last operation was initiated, it may be considered that the temperature will now rise slightly, so the pressure in bellows 48 must bleed almost down to its previous value before bimetal 32 is able to force arm 31 to the left, thereby closing nozzle 26 and again closing valve 12. As before, closing nozzle 26 and the resulting building up of branch line pressure causes bellows 48 to again expand and increase the bias exerted by spring 49. However, assuming that the space temperature has risen still further, more bias is required this time than the time before to move arm 31 to a valve opening position, hence the pressure must build up to a higher value in said bellows and, as this pressure build up requires time due to restriction 52 and capacity tank 53, this "off" period for the apparatus is longer than the previous one. However, when the pressure rises high enough in bellows 48 so that the actual temperature minus the bias amounts to 70°, nozzle 26 is opened as before, with a consequent opening of valve 12 and the supplying of more heat. Also, the pressure starts bleeding down from bellows 48 again, but this time it need not reach as low a value as before for, since the space temperature has risen somewhat, the added force of bimetal 32 is able to overcome more bias than before and still exert a force similar to what it would normally exert at 71° and thus again close the nozzle. This last cycle had a longer "off" period than before because a greater bias was required to force nozzle 26 open, and the "on" period was shorter than before because less of the bias had to be removed before nozzle 26 could be closed by bimetal 32. It should be noted that the rate of pressure build-up in bellows 48 diminishes as the pressure in said bellows approaches the branch line pressure, due to the diminishing pressure drop across restriction 52, and the rate of pressure drop in bellows 48 is initially high, due to the large pressure drop across the restriction, and gradually decreases as the bellows pressure approaches a branch line pressure of near zero. Thus, when bellows 48 is operating near its maximum pressure level, the pressure, and the increase in bias, builds up relatively slowly, and the pressure bleeds down rapidly, thus rapidly diminishing the bias. Likewise, when relatively low pressures are impressed on said bellows, the bias increases rapidly and decreases slowly. This tends to give long "off" periods and short "on" periods and when a large bias is used, and smaller bias gives shorter "off" periods and longer "on" periods. When the space temperature rises slightly above 71½ degrees, and nozzle 26 is closed, even the maximum bias of 1½ degrees cannot force said nozzle open against the force of bimetal 32, hence 71½ degrees rather than 71 degrees is now the upper limit of the control range of the present apparatus and valve 12 remains closed.

If the temperature should now go below 71½ degrees, the 1½ degrees bias is sufficient to overcome bimetal 32 and operate to open nozzle 26, thus supplying heat until the open nozzle bleeds down the pressure in bellows 48 sufficiently to diminish the bias to a value such that the resultant force on arm 31 is again equivalent to 71 degrees affecting bimetal 32, at which point said arm breaks away from the position shown and spring 29 forces plate 27 against nozzle 26 to thus start another "off" period which will continue until the bias increases enough to give the effect of a 70 degrees temperature at bimetal 32, with a resulting opening of the nozzle. Thus, the present apparatus cycles on a decrease in temperature in the same manner as when the temperature was increasing.

If the temperature should continue to decrease until it reaches 71 degrees or less, nozzle 26 will remain open as will valve 12 for, even with no bias, 71 degrees at bimetal 32 is required to snap arm 31 from the position shown to its opposite nozzle closed position. As there is nothing capable of closing nozzle 26 when the temperature is below 71 degrees, it remains open continuously, hence 71 degrees is now the lower limit of the operating range of the present apparatus and valve 12 remains open. Obviously, if the temperature should be slightly above 71 degrees, the pressure in bellows 48 would have to bleed nearly to zero to thus remove nearly all of the bias before bimetal 32 could close nozzle 26, thus causing a long "on" time and, upon closing the nozzle, the pressure would build up to cause a bias of slightly over a degree relatively rapidly, thus giving a short "off" period.

Obviously, in the apparatus shown, spring 49 exerts a force even when the pressure in bellows 48 is at a zero value hence the bias referred to is perhaps more properly called a change of bias. However, the net effect of the change in force or change in bias is exactly the same as if a bias be imposed, varied, or removed, hence there should be no difficulty from the terminology used.

Figure 2:
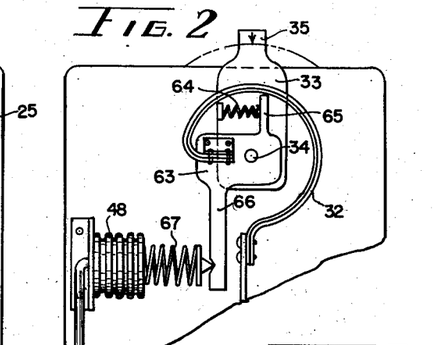
Figure 2 is a partial view of a modification of the thermostat of Figure 1.

The operation of the modification shown in Figure 2 is exactly the same as that of Figure 1, with the exception that the bias is imposed by moving bimetal anchor plate 63 slightly against spring 64 as the pressure builds up in bellows 48 and compresses spring 67 instead of imposing the bias directly on blade 31, the operation otherwise being the same. While Figure 2 does not show a capacity tank 53 in parallel with bellows 48, it is obvious that such a tank can be used if the timing requirements necessitate it.

Likewise, the apparatus of Figure 3 is similar in function to that of Figure 1 excepting the bias is imposed indirectly by shifting the nozzle assembly to the left as the pressure builds up in bellows 48 due to said bellows rotating member 73 clockwise and camming pin 71 to the left, it being obvious that, assuming that 31 is relatively stationary, movement of support member 70 to the left will cause valve plate 27 to engage 31 and open nozzle 26 to bleed out air in the same manner as previously described. Then, as the air pressure diminishes in the branch line and bleeds from bellows 48 through restrictor 52 due to the open nozzle, spring 67 then tends to force member 70 back toward the right by rotating member 73 counterclockwise to thereby remove the effective bias. Thus, the modification of Figures 2 and 3 differ in mechanical detail only and are functionally similar to Figure 1. While the apparatus herein shown involves pneumatic equipment and the biasing force is exerted as a function of branch line pressure, and with a suitable time delay, it is obvious that other arrangements may be used provided a two-position controller is involved and the bias is exerted under control of the controller and is somewhat retarded in effect, and wherein the bias may exceed the normal operating differential of the device.

This invention is not limited to temperature controlling equipment, and an application to humidity control will now be explained.

Figure 4

Figure 4:
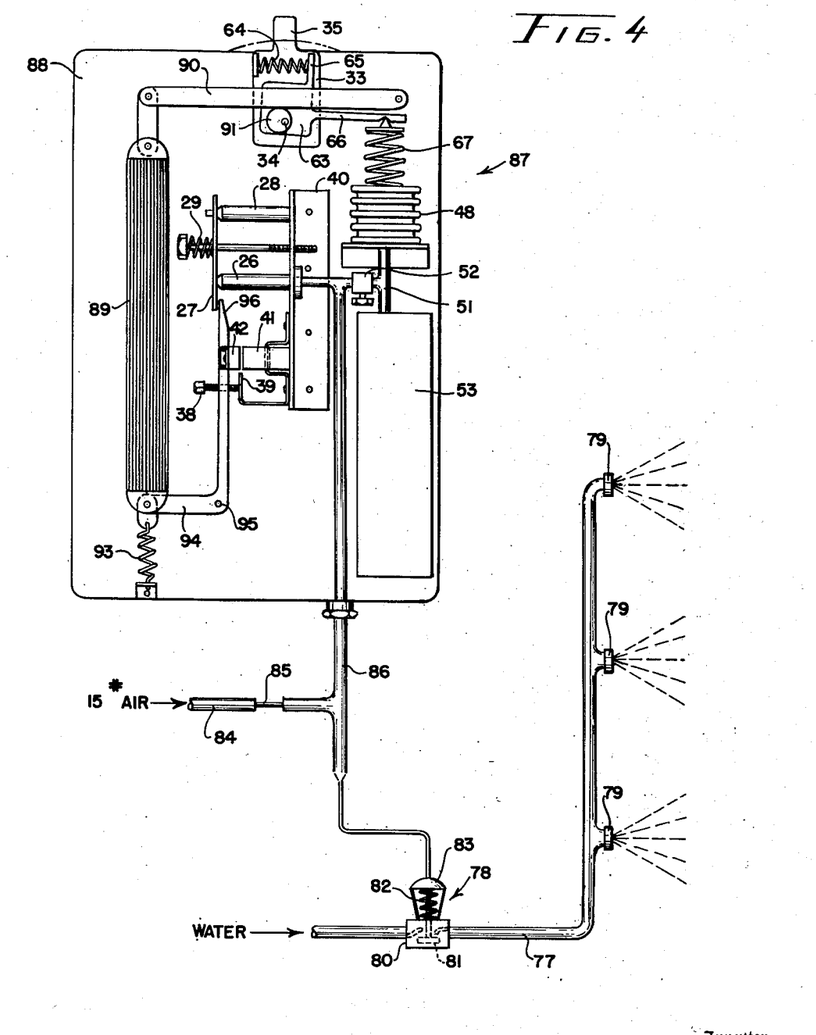
Figure 4 is a schematic view of a pneumatic humidity control system incorporating the present invention.

In Figure 4, water is supplied through pipe 77 under control of valve 78 to a plurality of atomizer heads 79, the water being supplied under sufficient pressure to finely atomize it for increasing the humidity in the space being treated, such as in a textile mill. Valve 78 is conventional and includes a body 80, a movable valve member 81, a spring 82 for moving the valve member 81 in an upper and closed position, and a pneumatic motor 83 for driving the valve member 81 to a lower open position. The air for operating motor 83 is furnished from a suitable source, as before, through pipe 84 and restrictor 85 to branch line air conduit 86. The branch line pressure is controlled by humidistat 87 which includes a base member 88 and a hair element 89 connected to a pivoted arm 90. Arm 90 is adjustable by an eccentric 91 which is attached to an anchor plate 63 freely pivotal on pivot 34. An upstanding arm 65 of plate 63 is biased clockwise by a spring 64 reacting against a flange of a member 33, said member being frictionally held on pivot 34 and moveable by adjustment handle 35. Arm 66 of member 63 is urged counterclockwise, and against the bias of spring 64, by spring 67 which reacts against bellows 48. With this arrangement, adjustment of 35 varies the bias of spring 64, thus causing a new equilibrium position for member 63 and cam 91 and thus a new working position for element 89 and, likewise, a variation in the pressure in bellows 48 and a corresponding change in the force exerted by spring 67 will vary the working position of element 89, and thus shift the control point of the device in a manner similar to the device of Figure 2. The other end of element 89 is attached to a spring 93 and to bell crank 94 pivoted on a stationary pin 95 and having an upwardly extending valve plate operating portion 96. Spring 93 keeps element 89 under a substantially uniform tension at the control point and furnishes the force for operating lever counterclockwise when element 89 elongates or is shifted. The controller valve mechanism of this device is similar to that previously described and includes nozzle 26 attached to base 88 by a supporting flange 40, and a nozzle or valve plate 22 is pivotally connected to this mounting flange by pivots 28, only one of which is shown. Valve plate 27 is held against nozzle 26 by a spring 29. To provide snap action for the present valve mechanism, a soft iron armature 42 is attached to plate operating member 96 and coacts with a small permanent magnet 41 in the same manner as in the previously described examples, the proximity of the armature to the magnet being limited by stop screw 38 coacting with stop flange 39. As the biasing means used in this example is similar to that used in Figure 1, it is numbered in a similar fashion, as above noted.

In describing the operation of this apparatus, it may be assumed that, with zero pressure in bellows 48, spring 93 tends to rotate lever 94 counterclockwise and the magnetic attraction of elements 41 and 42 and the tension of hair element 89 tend to rotate bell crank 94 clockwise, this latter rotation being limited by stop screw 38 engaging stop flange 39. Further, when valve plate 27 is in an open position, spring 29 also assists in moving portion 96 in a clockwise direction. Assuming now, for instance, that with zero pressure in bellows 48, the present instrument has an operating differential of about 4% relative humidity and is adjusted so that, with a relative humidity of 50%, the apparatus is in the position shown, the branch line air pressure is near 15 pounds per square inch, valve 78 is open and water is being sprayed from atomizer heads 79. This will tend to increase the relative humidity and, as it increases, hair element 89 tends to expand and, when this expansion is a result of a 4% increase in relative humidity, the normal bias of spring 93 is sufficient to force member 96 to the left against the magnetic attraction of elements 41 and 42, the pull exerted by element 89 and the force of spring 29 to thereby force plate 27 away from nozzle 26 and bleed the branch line pressure down to near zero. Bleeding down the branch line pressure permits valve 78 to be closed by spring 82, thereby stopping the flow of water from the atomizer heads and permitting the relative humidity to again diminish.

The contraction of hair element 89 as the humidity again decreases causes bell crank 94 to rotate clockwise and permit the closing of valve plate 27 against nozzle 26, this action taking place positively due to the effect of the magnet snap mechanism. If it now be further assumed that the bias effected by bellows 48 having 15 pounds of air therein amounts to the equivalent of 6% change in relative humidity, it appears that the pressure in bellows 48 will vary towards 15 pounds when nozzle plate 27 engages nozzle 26 and the branch line pressure is at 15 pounds. However, as pressure builds up in bellows 48 and the bias of spring 67 is increased, the effect of this bias, added to the effect of the actual relative humidity on element 89, tends to exceed the 4% relative humidity, in effect, needed for opening nozzle 26 and this effective value will be reached before the pressure in bellows 48 reaches 15 lbs. per square inch. Starting with an actual 50% relative humidity, only ⅔ of the maximum bias changing ability of bellows 48 needs to be used to open nozzle 26 hence, as the pressure builds up in bellows 48, element 89 is shifted downward, permitting spring 93 to cause valve plate 27 to move nozzle 26, thereby bleeding the branch line pressure to near zero and causing valve 78 to close. The open nozzle 26 not only bleeds down the branch line as before but also bleeds the air out of bellows 48, thereby diminishing the bias and moving element 89 upwardly toward its former working position. It was previously assumed that there was zero bias from bellows 48 with the apparatus in the position shown but this is obviously only a preliminary assumption because, with the valve plate closed against the nozzle, a maximum bias tends to result. Assuming that a resultant relative humidity of 54% is required for opening the nozzle, then it is obvious that it can be opened at an actual relative humidity of about 48% for the 48% plus the 6% equivalent of bias equals the 54% required to open the valve member and, if the relative humidity should fall below 48%, then the nozzle cannot be opened because, even with a 6% equivalent bias, the necessary 54% resultant cannot be attained. Therefore, 48% appears to be the low end of the relative humidity range of this apparatus, as adjusted.

If the actual relative humidity should now rise above 50%, it is apparent that valve member 27 cannot be closed against nozzle 26, for the bias of spring 93, even with zero pounds pressure in bellows 48, is sufficient to hold this valve member open, it being previously noted that an equivalent of 50% or lower relative humidity was required to close the nozzle plate. Therefore, 50% becomes the upper value of relative humidity to be controlled by this apparatus, and intermediate values, such as between 48% and 50%, will result in the present apparatus cycling on and off in the same manner as in the previous examples.

This intermittent operation of controller 86 and water valve 76 provides a good control arrangement for atomizer heads because they are either supplied with water at full pressure or the water is turned off, hence a proper spray is obtained when needed. Also, for the reasons explained in the previous example, the "on" periods tend to be short and the "off" periods long as the upper value of humidity is approached and the "on" periods are relatively long and the "off" periods relatively short as the lower value is reached. Further, when the relative humidity is above the upper end of the operating differential of the apparatus, the spray heads are maintained continuously off and when the humidity is below the lower end of the differential, the heads are maintained in continuous operation.

This invention also has utility for controlling pressure in a system having a relatively large volumetric capacity and wherein modulation of the flow valve controlling said pressure is not desired for one reason or another. An example of a control arrangement of this sort is shown in Figure 5.

Figure 5:
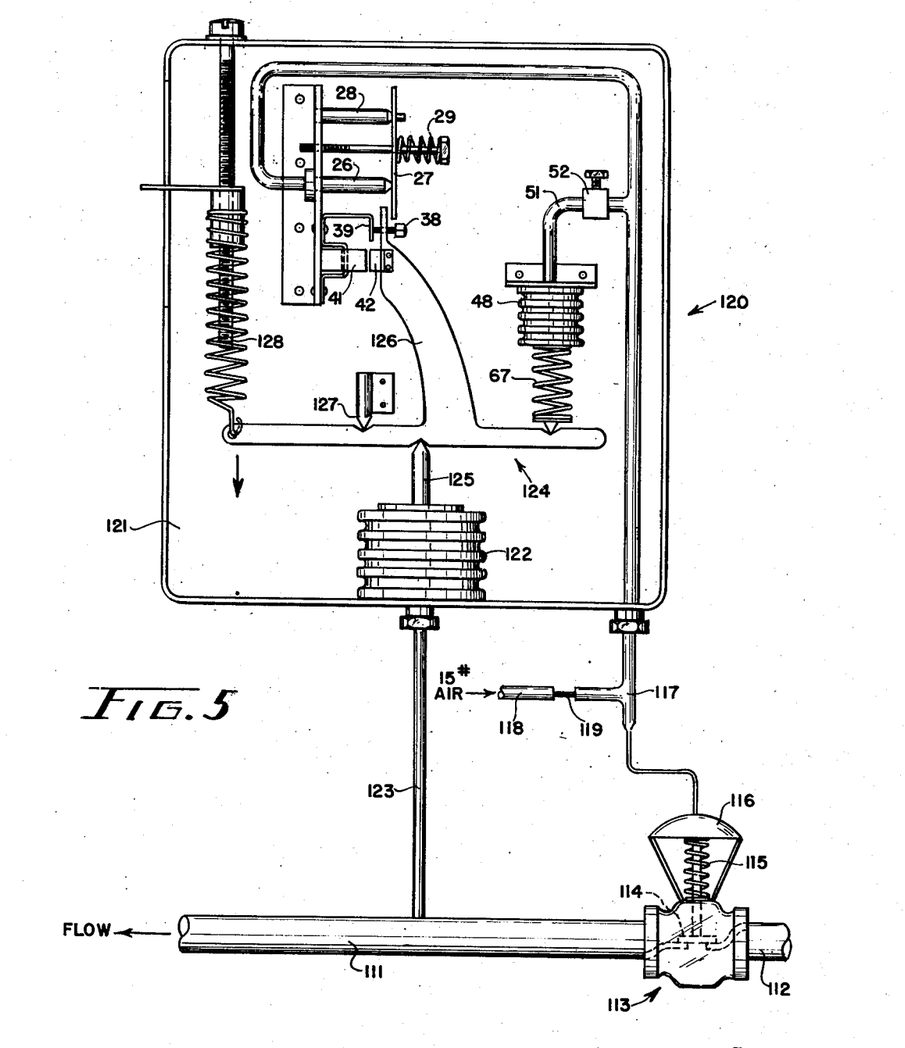
Figure 5 is another schematic view of the present invention as applied to a pressure controller.

*Figure 5*

In Figure 5, steam is fed into the jacket of a cooking kettle or the like, not shown, through pipe 111 from a suitable source 112 under control of valve 113, this valve being of the normally open sort wherein valve member 114 is held in an upper open position by spring 115 and is driven to a lower closed position by pneumatic motor 116. Motor 116 is supplied air from branch line 117 which is connected to main 118 through restrictor 119, with branch line pressure depending upon the operation of pressure controller 120. Controller 120 includes a housing 121 to which is attached a bellows 122 connected to pipe 111 by a tube 123, bellows 122 thereby responding to the pressure controlled by valve 113. The pressure exerted by the bellows 122 is transmitted through a strut member 125 against a lever member 124 pivoted at 127 and urged in a clockwise direction by spring 128, bellows 122 operating to move the lever member 124 in a counterclockwise direction. Arm 126 of member 124 is used to operate a valve mechanism similar to that previously described and which is provided with a similar magnet snap mechanism, the apparatus being so arranged that a relatively high pressure in pipe 111 causes counterclockwise rotation of 126 until stopped by stop screw 38 engaging stop flange 39, this permitting spring 29 to close valve plate 27 against nozzle 26 and building up branch line pressure sufficient to drive valve member 114 to its lower closed position, thereby permitting the controlled pressure to diminish. A relatively low pressure permits spring 128 to rotate lever 126 in a clockwise direction and thus permits arm 126 to lift valve plate 27 away from nozzle 26, thereby bleeding the branch line pressure down and permitting spring 115 to open valve 113 and permit flow from the supply line 112 through pipe 111.

To cause cyclic operation of valve 113, bellows 48 and spring 67 are connected through conduit 51 and restrictor 52 to the branch line, in the same way as before, so that, when nozzle 26 is closed by plate 27, pressure builds up in bellows 48 and increases the bias on lever 126 by compressing spring 67, this having the effect of tending to rotate lever 126 in a clockwise direction to again move plate 27 away from nozzle 26 to permit an opening of valve 113. Opening valve 113, of course, increases the pressure in 111 and therefore increases the force exerted by bellows 122 tending to drive lever 126 in a counterclockwise direction. Also, when nozzle plate 27 is moved away from nozzle 26 so that the branch line pressure is reduced, the bias exerted on lever 126 by bellows 48 is also diminished and 126 tends to move back to the position shown.

Without assuming values of differential for the normal operation of this pressure controller and then assuming a larger bias value for bellows 48, suffice it to say that the effect of the variable bias on the controller in this example is precisely the same as in the previous example and results in, what normally would be the lower limit of a particular setting becoming the upper limit and the actual lower limit being displaced downwardly from that value by an amount equal to the difference of the maximum bias and the normal differential, as previously explained. Likewise, at intermediate values of pressure, the apparatus will cycle "on" and "off" with the length of the respective "on" and "off" periods depending upon whether an upper or a lower limit is being approached.

In addition to being useful for controlling steam flow to cooking kettles, or other such use wherein the pressure changes relatively slowly as the control valve is opened or closed, this arrangement may be used for refrigeration control wherein valve 113 is in series with a fixed expansion device such as an orifice or small tube, not shown, bellows 122 being connected to the low pressure side of the expansion device.

As previously pointed out, the examples given above are merely illustrative, and many substitutions and equivalents are readily visualized by one skilled in the art. For instance, other forms of snap acting mechanism may be used, other pneumatic valve arrangements may be used and it is not even necessary that this apparatus be pneumatic in operation so long as the bias gradually varies in amount and may exceed the normal operating differential of the instrument. Also, if desired, a two position non-bleed valve may be used in the controller instead of the bleed valve shown. Because of the many substitutions and equivalents readily perceived by those skilled in the art, I wish to be limited only by the appended claims.

I claim:

1. In a conditioning system having a conditioning element, a conduit for delivering conditioning medium to said element from a suitable source, valve means for controlling flow through said conduit means, pneumatic motor means for operating said valve means, controller means responsive to a condition varied by said element, branch conduit means connecting said controller to said pneumatic motor means, air supply means also connected to said conduit means, said controller including an adjustable motor means connected to said conduit means and arranged to continuously adjust said controller by a predetermined amount when the pressure in said branch conduit is at its maxium value and a lesser amount when said branch conduit pressure is at a lower value, air flow delay means in said connection between said adjusting means and said branch conduit means, said controller including a pneumatic valve means definitely movable to either a fully open position or a fully closed position as said condition responsive means responds to changing values of said condition, the difference in condition values required to operate said valve means from one position to the other being less than the maximum adjustment provided by said adjusting motor.

2. Pneumatic control apparatus for a temperature changing system having temperature control means operable to on and off positions, a pneumatic motor means for controlling the temperature control means, a controller for said motor means including a device responsive to temperature in a space being treated, said controller also including valve means operable by said device, said valve means being connected to said motor means and arranged to control the air pressure imposed on said motor means, mechanism for causing operation of said valve to one or another of two positions upon temperature changes within the control range of said apparatus, said mechanism tending to cause said controller to operate with a predetermined differential, adjustable continuously active biasing means including a relatively small pneumatic motor arranged to adjust said controller, and conduit means including a flow restriction connecting said small motor to said controller valve means, said biasing means being capable of adjusting said apparatus by an amount exceeding said differential.

3. Control apparatus for a steam heating system having heat control means operable to on and off positions and having a motor means for actuating said control means, a controller for said motor means including a device responsive to temperature in a space being heated by said system, said controller also including control means operable by said condition responsive device connected in controlling relation to said motor means, mechanism for causing operation of said control means to one of two positions by said condition responsive device upon temperature changes in said space within the controlling range of said apparatus, continuously active force exerting adjusting means connected to said control means and capable of adjusting said apparatus by an amount greater than the temperature change normally required to cause operation of said control means from one position to another position, and time delay means arranged to delay the response of said force exerting adjusting means upon a position change of said control means, the force exerted by said adjusting means thus being dependent on the time elapsing after operation of said control means and the functioning of said time delay means.

4. A humidity control system comprising a spray nozzle; a supply of water under pressure connected to said nozzle; a valve for controlling said supply; a motor for actuating said valve, and a controller connected in controlling relation to said motor, said controller including a force exerting element responsive to humidity, a control device arranged to be operated by said humidity responsive element and capable of controlling said motor, snap acting means arranged to cause two-position operation of said device by said element, force exerting biasing means arranged to continually adjust the operative relation between said device and said element, said biasing means being variably operable in accordance with the operative position in said device, and means for delaying the response of said biasing means to a changed position of said device.

5. In a pressure controlling system, pneumatic motor means arranged to actuate a pressure changing device, a controller for said motor means, said controller including means responsive to pressure and a pneumatic valve means operable to be opened or closed by said pressure responsive means upon variations in pressure, snap action means for causing said valve means to be operated to either a closed or fully open position, said controller requiring a predetermined difference in pressure to operate said valve means from one position to another position, conduit means connecting said valve means to said motor means, and force exerting second motor means connected to said conduit means and arranged to continually adjust said controller in a direction to cause said valve means to be driven to its opposite position by variations in its force, said second motor means being capable of adjusting said controller by an amount exceeding the value of said predetermined difference.

6. In a pneumatic controlling system, pneumatic motor means arranged to actuate a condition changing device, a controller for said motor means, said controller including force exerting means responsive to the condition being controlled and a pneumatic valve means operable to an open or closed position by said condition responsive means upon variations in said condition, snap action means for causing said valve means to be operated to either a closed or fully open position, conduit means connecting said valve means to said motor means, said controller requiring a predetermined difference in said condition to operate said valve means from one position to another position, and second force exerting motor means connected to said conduit means and arranged to adjust said controller in a direction to cause said valve means to be driven to its opposite position by variations in its force due to variations in pressure in said conduit, said second motor means being capable of adjusting said controller by an amount exceeding the value of said predetermined difference.

7. In a pneumatic condition controlling system; a device for changing said condition; motor means for controlling said device; pneumatic controller means for said motor means; conduit means connecting said controller means to said motor means; said controller means including a force exerting condition responsive means and a valve means arranged to be operated by said condition responsive means and connected to a suitable supply of air under pressure, said conduit means and to the atmosphere, snap acting mechanism for causing said condition responsive means to operate said valve means to one of two definite positions as said condition changes by a predetermined amount, resilient means arranged to bias said condition responsive means in one direction, a pneumatic motor means connected to said conduit means and constructed and arranged to adjust the bias exerted by said resilient means to thereby adjust said controller by an amount exceeding said predetermined difference of said condition and in a direction to anticipate a change in said condition, and adjustable time delay means for controlling the rate of response of said pneumatic motor means to variations in pressure of air in said conduit means.

8. Control apparatus for a steam heating system having heat control means operable to on and off positions and having motor means for actuating said control means, a controller for said motor means including a force exerting device responsive to temperature in a space being heated by said system, said controller also including valve means operable by said condition responsive device connected in controlling relation to said motor means, mechanism for causing operation of said valve means to one of two positions by said condition responsive device upon temperature changes in said space within the controlling range of said apparatus, force exerting adjusting means connected to said valve means and capable of adjusting said apparatus up to an amount greater than the temperature change normally required to cause operation of said valve means from one position to another position, and time delay means arranged to delay the rate of response of said force exerting adjusting means upon a position change of said valve means.

9. A temperature controller comprising a pneumatic valve means, a temperature responsive means arranged to operate said valve means, snap acting mechanism arranged to cause operation of said valve means to either of two positions, said mechanism tending to require a predetermined differential of temperature for operation of said valve means from one of its positions to its other position, and force exerting adjustable biasing means constructed and arranged for adjusting said controller by a variable amount which may exceed said differential, said biasing means including a pneumatic motor and conduit means including a flow restriction connecting said motor to said valve means, said flow restriction varying the rate of response of said biasing means to a change in said pneumatic valve means.

10. A humidity controller comprising a pneumatic valve means, a force exerting humidity responsive element arranged to operate said valve means, snap acting mechanism arranged to cause operation of said valve means to either of two positions, said mechanism tending to require a predetermined differential of humidity for operation of said valve means from one of its positions to its other position, and adjustable force exerting biasing means constructed and arranged for adjusting said controller by a variable amount which may exceed said differential, said biasing means including a pneumatic motor and conduit means including a flow restrictor connected to said valve means, said flow restrictor controlling the rate of adjustment of said biasing means.

11. In a humidity controlling system, pneumatic motor means arranged to actuate a humidity changing device, a controller for said motor means, said controller including a humidity responsive element and a pneumatic valve means operable to open or closed position by said humidity responsive element upon variations in humidity, snap action means for causing said valve means to be operated to either a closed or fully open position, conduit means connecting said valve means to said motor means, said controller tending to require a predetermined difference in humidity to operate said valve means from one position to its other position, and second force exerting motor means connected to said conduit means and arranged to continuously adjust said controller in a direction to cause said valve means to be driven to its opposite position, said second motor means being capable of adjusting said controller by an amount exceeding the value of said predetermined difference.

12. A pressure controller comprising a bleed-type pneumatic valve means, a pressure responsive means arranged to operate said valve means, a snap acting mechanism arranged to cause operation of said valve means to either of two positions, said mechanism tending to require a predetermined differential of pressure for operation of said valve means from one of its positions to another of its positions, and adjustable force exerting biasing means constructed and arranged for continually adjusting said controller by a variable amount which may exceed said differential, said biasing means including a pneumatic motor and conduit means with a flow restriction connecting said motor to said valve means, said flow restriction functioning to control the rate of adjustment of said controller by said biasing means.

13. A time modulating pneumatic pressure controller comprising a base, a pneumatic valve unit attached to said base, a pressure responsive device arranged to operate said valve unit, snap acting means arranged to insure two-position operation of said valve unit by said device, said snap acting means requiring a predetermined change in the operating force exerted by said device on said unit for operating said unit from one position to another, force exerting biasing means arranged to variably adjust the operative relation between said device and said valve unit, said biasing means being capable of adjusting the operative relation of said element and units by an amount exceeding the effect of said predetermined change in force, and connecting means including a time delay means arranged between said valve unit and said biasing means for controlling the rate of adjustment effected by said biasing means in accordance with the operation of said valve unit.

14. A time modulating pneumatic humidity controller comprising a base, a pneumatic valve unit attached to said base, a humidity responsive element arranged to operate said valve unit, snap acting means arranged to insure two-position operation of said valve unit by said element, said snap acting means requiring a predetermined change in the operating force exerted by said element on said unit for operating said unit from one position to another, force exerting biasing means arranged to variably adjust the operative relation between said element and said valve unit, said biasing means being capable of adjusting the operating relation of said element and unit by an amount exceeding the effect of said predetermined change in force, and connecting means including time delay means arranged between said valve unit and said biasing means for controlling the rate of adjustment effected by said biasing means in accordance with the operation of said valve unit.

15. A time modulating pneumatic thermostat comprising a base, a pneumatic valve unit attached to said base, a thermostatic element arranged to operate said valve unit, snap acting means arranged to insure two-position operation of said valve unit by said element, said snap acting means requiring a predetermined change in the operating force exerted by said element on said unit for operating said unit from one position to another, force exerting biasing means arranged to variably adjust the operative relation between said element and said valve unit, said biasing means being capable of adjusting the operative relation of said element and unit by an amount exceeding the effect of said predetermined change in force, and connecting means including time delay means arranged between said valve unit and said biasing means for causing operation of said biasing means in accordance with the operation of said valve unit, said time delay means controlling the rate of adjustment effected by said biasing means.

16. Control apparatus for a condition changing device operable by a pneumatically controlled motor movable between limiting positions, a controller for said device comprising an element arranged to exert a force variable in accordance with changes in a condition affected by operation of said device, a pneumatic valve operable by said element, snap acting means for insuring that said valve will be operated only to closed or fully open position, a predetermined change in said condition being required to cause said element to move said valve from one position to another position, conduit means for connecting said valve to a suitable source of air and to said motor, second pneumatic motor means connected to said conduit means on the valve side of said restriction, and resilient means connecting said second motor means to said apparatus in a manner to continuously adjust the operative relation between said element and said valve, said pneumatic motor means being capable of adjusting said apparatus by an amount greater than the effect of predetermined change of the condition on said apparatus.

FREDERICK D. JOESTING.

References Cited in the file of this patent

UNITED STATES PATENTS

| Number | Name | Date |
| --- | --- | --- |
| 1,162,170 | Johnson | Nov. 30, 1915 |
| 1,455,633 | Lundgaard | May 15, 1923 |
| 1,619,351 | Lindsay | Mar. 1, 1927 |
| 1,920,827 | Wunsch | Aug. 1, 1933 |
| 2,364,917 | Ray | Dec. 12, 1944 |
| 2,437,156 | Frick | Mar. 2, 1948 |
| 2,562,201 | Merwin | July 31, 1951 |